US007796793B2

(12) United States Patent
Luo (10) Patent No.: US 7,796,793 B2
(45) Date of Patent: Sep. 14, 2010

(54) DETERMINING MAMMOGRAPHIC IMAGE VIEW AND LATERALITY

(75) Inventor: Hui Luo, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1029 days.

(21) Appl. No.: 11/533,404

(22) Filed: Sep. 20, 2006

(65) Prior Publication Data
US 2008/0069416 A1 Mar. 20, 2008

(51) Int. Cl.
*G06K 9/00* (2006.01)
(52) U.S. Cl. .................................... 382/128
(58) Field of Classification Search .......... 382/128, 382/132, 156, 151, 201, 294, 218; 378/62, 378/37; 606/130
See application file for complete search history.

(56) References Cited

U.S. PATENT DOCUMENTS

| 5,917,929 | A | 6/1999 | Marshall et al. | |
|---|---|---|---|---|
| 2002/0050082 | A1 | 5/2002 | McGinty | |
| 2004/0161164 | A1 | 8/2004 | Dewaele | |
| 2004/0234125 | A1* | 11/2004 | Menhardt et al. | 382/156 |
| 2005/0018893 | A1 | 1/2005 | Wang et al. | |
| 2007/0076938 | A1* | 4/2007 | Hartman et al. | 382/132 |

FOREIGN PATENT DOCUMENTS

EP 0 889 438 A2 1/1999
WO WO 02/45437 6/2002
WO WO 2005/052849 6/2005

OTHER PUBLICATIONS

Y. Attikiouzel et al., "DSP In Mammography," Digital Signal Processing, 2002, 2002 14th International Conference on Santorini, Greece 1-3, Jul. 2002, Piscataway, NJ USA, IEEE US, vol. 1, 1 Jul. 2002, pp. 29-34, XP010599682.
R.J. Ferrari et al., "Analysis of Asymmetry in Mammograms via Directional Filtering With Gabor Wavelets," IEEE Transactions on Medical Imaging, IEEE Service Center, Piscataway, NJ, US, vol. 20, No. 9, Sep. 2001, pp. 953-964, XP001100472.
Frederic F. Faizon et al., "Computerized Analysis of Asymmetry in Digitized Mammograms," Bioengineering Conference, 2000, Proceedings of the IEEE 26th Annual Northeast Storrs, CT, USA Apr. 8-9, 2000, Piscataway, NJ, pp. 73-74, XP010379521.
S.M. Naylor et al., "A Study to Find the Optimal Orientation of the Breast for the Cranio Caudal View, for Screening Purposes," Clinical Radiology, Livingstone, Harlow, GB, vol. 54, No. 12, Dec. 1999, pp. 804-806, XP004552402.

* cited by examiner

*Primary Examiner*—Vu Le
*Assistant Examiner*—Claire Wang (57) ABSTRACT

A method for displaying a mammography image. Digital data of the mammography image is obtained. The mammography image is segmented to identify at least a first diagnostically relevant region comprising an image of the breast tissue and a second diagnostically relevant region. A view type is assigned for the image, either cranio-caudal or medio-lateral oblique view, according to a symmetry index calculated from the segmented first diagnostically relevant region. Right or left laterality is assigned to the image according to a laterality feature calculated according to the relative position of at least the second diagnostically relevant region within the image.

8 Claims, 7 Drawing Sheets

|  | RCC | LCC | RMLO | LMLO | |
|---|---|---|---|---|---|
| Image 1: | 0.2 | 0.3 | (0.6) | 0.3 | RMLO |
| Image 2: | 0.2 | 0.5 | 0.1 | (0.8) | LMLO |
| Image 3: | (0.7) | 0.1 | 0.4 | 0.1 | RCC |
| Image 4: | 0.1 | (0.5) | 0.1 | 0.4 | LCC |

FIG. 7

DETERMINING MAMMOGRAPHIC IMAGE VIEW AND LATERALITY

FIELD OF THE INVENTION

This invention generally relates to techniques for processing mammogram images, and more particularly to techniques for automatic detection of view type and laterality for digital mammographic images.

BACKGROUND OF THE INVENTION

Screening mammography is a method for detecting signs of breast cancer in otherwise asymptomatic women. The American College of Radiology recommends annual mammography for women over forty. Women undergo an X-ray exam in which X-ray films of the breast are exposed and then developed for later review. A radiologist reads the films and assesses the likelihood of the presence of signs of breast cancer. If a suspicious finding is present, the woman may be invited for additional, more detailed diagnostic X-ray exams, ultrasonic exams, and/or biopsy.

In a typical screening exam in the United States, four X-rays of the breast are obtained. In conventional practice, two mammographic views are obtained for each breast: a cranio-caudal (CC) view is obtained by positioning the X-ray film horizontally under the compressed breast, and a medio-lateral oblique (MLO) view is obtained by positioning the X-ray film in a plane that is approximately orthogonal to the left-right axis. In some situations, more or fewer X-ray views may be obtained. The four views are typically labeled LCC (Left Cranio-Caudal), RCC (Right Cranio-Caudal), LMLO (Left Medio-Lateral Oblique) and RMLO (Right Medio-Lateral Oblique). Knowledge of the laterality (that is, Left/Right side, facing toward the patient) and type of mammographic view (that is, whether the view is a CC or MLO view) is critical for the review process.

It is common in radiological practice to display the different exposures for a patient in a particular format, often referred to as a hanging protocol. Initially devised when film media was used exclusively, the hanging protocol determined the specific spatial arrangement with which the radiologist or technician arranged the films on the light box, according to practitioner preferences. In a conventional hanging protocol for screening mammography, the LCC, RCC, LMLO, and RMLO views are typically displayed in mirrored fashion, such that the thorax edges of both breasts are centered, with the left breast image displayed on the right and the right breast image displayed on the left. However, both breasts images are acquired in a similar manner. It is, in general, not known which image corresponds to the left or the right breast; one image must be flipped before it can be positioned adjacent to the other image. In conventional screen-film imaging, X-ray-markers, for example comprised of opaque lead letters, are radiographed simultaneously (appropriately labeled RCC, LCC, RMLO and LMLO) with the breast tissue. As can be expected, not all films are correctly labeled or oriented properly for viewing, due to technician inexperience or error.

In order to suit practitioner expectations and to allow a smooth transition from film-based to digital radiography, the practice of using X-ray markers still applies for mammography imaging using images scanned from film or computed radiography (CR) cassettes. In place of the conventional light box, high resolution monitors can now be used to display patient exposures as digital images. The same hanging protocol can still be used by the practitioner for display of mammography images.

Figure 1:
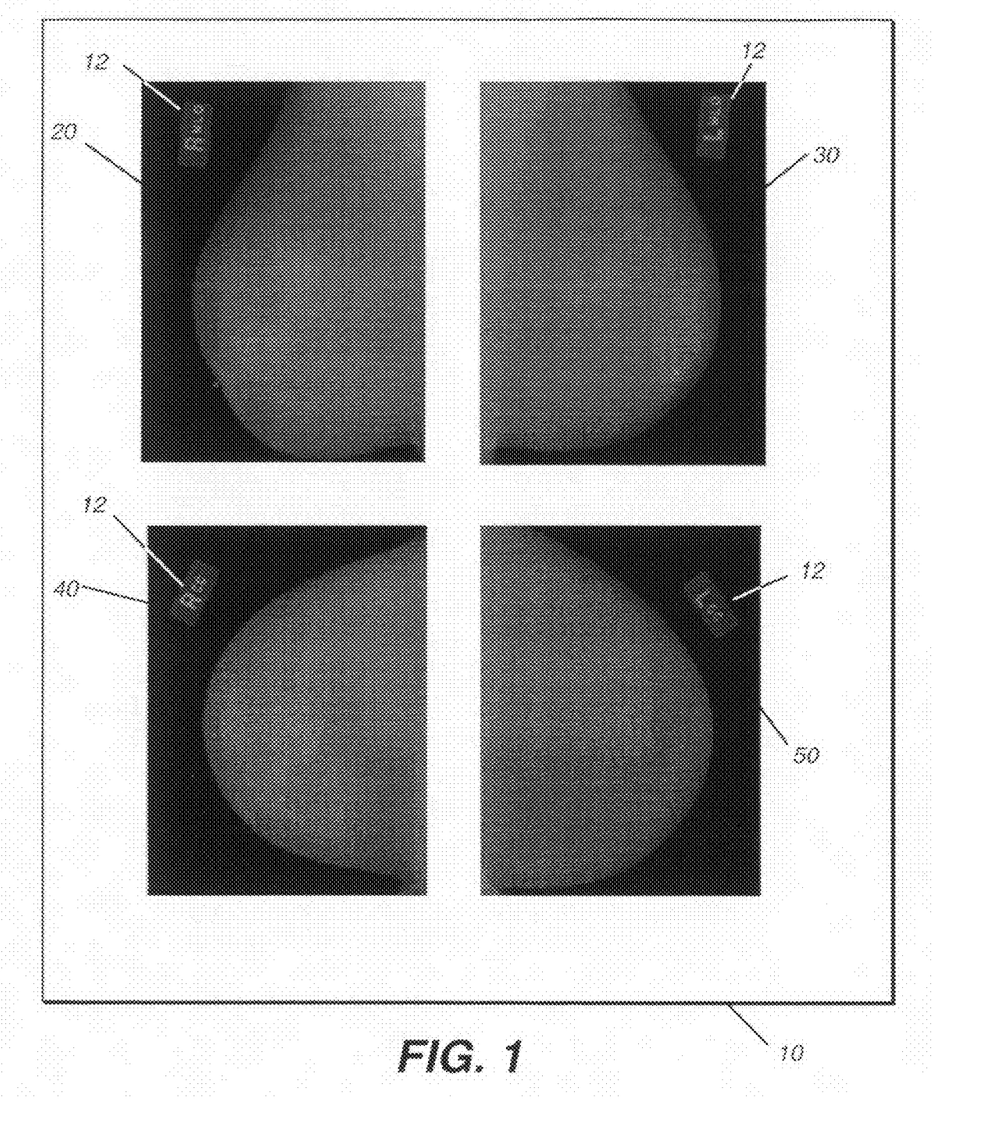
FIG. 1 is a plan view of a typical hanging protocol on a display.

FIG. 1 shows a typical hanging protocol arrangement that is used. A display 10 has an RMLO image 20, an LMLO image 30, an RCC image 40, and an LCC image 50 arranged as shown. Each image has a corresponding marker 12, placed by the technician nearest the axilla of the patient prior to imaging.

It is desired that the mammography images, once obtained digitally, be displayed in the proper orientation and order in the hanging protocol. In order for this to happen, each image needs to be properly identified as to its type (MLO or CC) and side, or laterality (R or L).

U.S. Pat. No. 5,917,929 (Marshall et al.) entitled "User Interface for Computer Aided Diagnosis System" describes an operator interface panel that accepts operator commands on films for scanning and their proper identification and orientation. While such an approach may be workable for scanned films, however, this type of method requires operator interaction and is subject to operator error. It can be appreciated that automated solutions for detection of type and laterality of digital mammography images would be preferable to those requiring an operator.

There have been some attempts to solve this problem using image analysis techniques. Some examples are provided.

U.S. Publication No. 2004/0161164 (Dewaele) entitled "Method of Detecting the Orientation of an Object in an Image" describes orientation detection using mathematical moments of various axes or landmarks for shape detection.

PCT Application No. WO 02/45437 (Hartman et al.) entitled "Method and System for Automatic Identification and Orientation of Medical Images" describes a method using a set of templates for optical character recognition and other techniques for determining image orientation automatically.

PCT Application No. WO 05/052849 (Bamberger) entitled "Method for Computerized Analysis in Mammography" describes a workstation and method for identifying when an image from film has been inadvertently flipped with the incorrect orientation or rotation.

While these examples may be directed to image orientation, there is room for improvement, particularly with respect to noise effects, handling of operator error, and overall robustness. Thus, there is a need for a capable and robust solution for determining image type and laterality for digital mammography images.

SUMMARY OF THE INVENTION

One object of the present invention is to provide an automated method for identifying the view and laterality of mammography images. Another object of the present invention is to provide an automated method for detecting the orientation of mammography images in order to automatically display mammography images for diagnosis.

According to one aspect of the present invention there is provided a method for displaying a mammography image. Digital data of the mammography image is obtained. The mammography image is segmented to identify at least a first diagnostically relevant region comprising an image of the breast tissue and a second diagnostically relevant region. A view type is assigned for the image, either cranio-caudal or medio-lateral oblique view, according to a symmetry index calculated from the segmented first diagnostically relevant region. Right or left laterality is assigned to the image according to a laterality feature calculated according to the relative position of at least the second diagnostically relevant region within the image.

An advantage of the method of the present invention is that it does not require interpreting text characters from a marker used to identify image orientation; only the presence of the marker in a suitable location in the image is needed.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

The present description is directed to elements forming part of, or cooperating more directly with, apparatus in accordance with the invention. It is to be understood that elements not specifically shown or described may take various forms well known to those skilled in the art.

The method of the present invention uses analysis of segmented images and probability logic to identify type and laterality for mammography images. Using the method of the present invention, a system can accept, as input image data, the standard set of mammography images for a patient and can identify the image view type (MLO or CC) and laterality (R or L). These images can then be provided to a system for display using an appropriate hanging protocol or pattern that meets the needs of the radiology practitioner.

The method of the present invention makes some assumptions about digital mammography images. For example:

(i) The images are of the standard image set with four views (RCC, LCC, RMLO, and LMLO), or two views for a breast.

(ii) There is a marker, placed by the technician at the time of image capture in the proper position. However, the marker need not be the correct one. (For example, the LMLO marker may have been incorrectly used during capture of the RMLO image).

Figure 2:
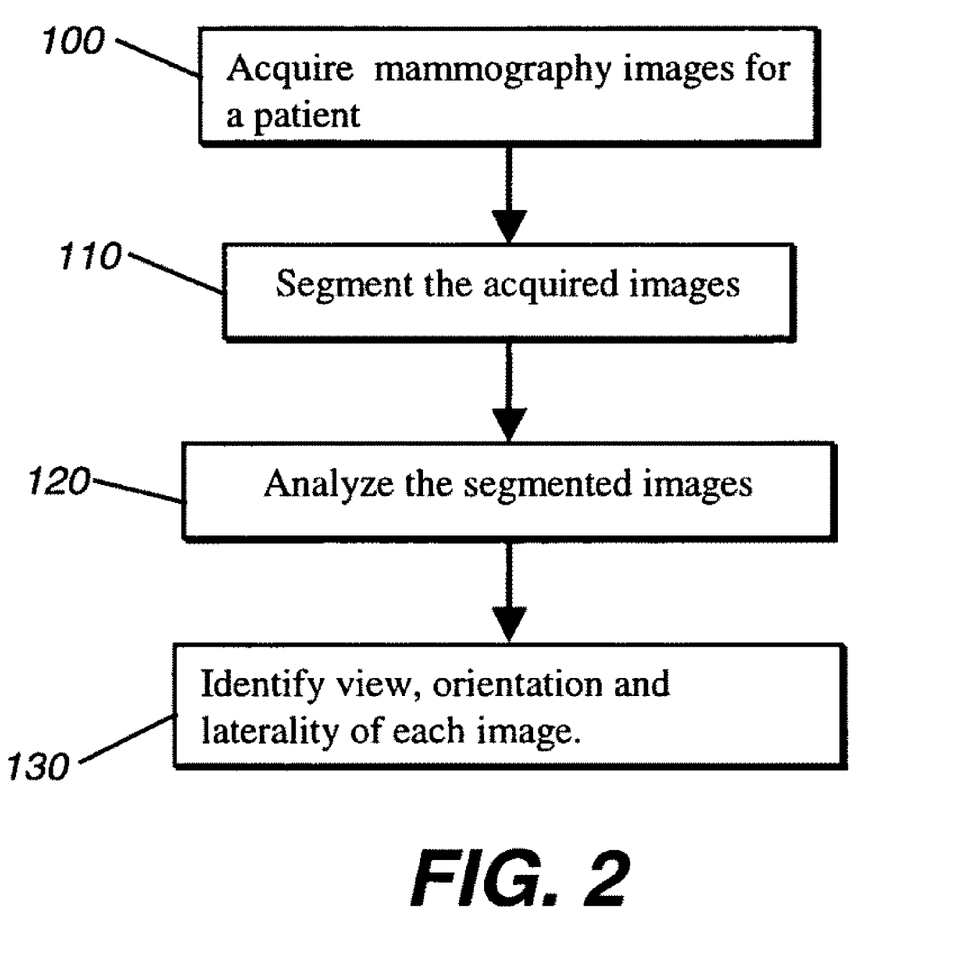
FIG. 2 is a logic flow diagram showing the method of the present invention.

Referring to FIG. 2, there is shown a block diagram of the basic steps in logic flow for using the method of the present invention.

In an image acquisition step 100, the images of a patient are obtained as digital data. This can be image data generated/captured directly as digital data, such as, for example, from scanned film, computed radiography (CR), or digital radiography (DR).

A segmentation step 110 is executed to segment the radiographic images to identify at least two segmented regions; three basic regions are generally identified by segmentation, as described subsequently. A collimation region (that is, foreground) is the area of the image that is occluded to X-ray collimation during the exposure and normally presents salient borders surrounding the body part. Direct exposure regions (that is, background) are areas that have received direct X-ray exposure. Diagnosis useful regions (that is, anatomy) contain the breast tissue region and the marker region.

There are known segmentation techniques that could be applied in step 110. The method outlined in U.S. Publication No. 2005/0018893 entitled "Method of Segmenting a Radiographic Image into Diagnostically Relevant and Diagnostically Irrelevant Regions" by Wang et al., incorporated herein by reference, can be used. This process typically involves sub-sampling of the original image to generate an image of coarser resolution that can be more easily processed and segmenting the anatomy region from the sub-sampled image. Other segmentation techniques may obtain two thresholds from the image histogram, then segment the image into the foreground, background, and anatomy regions based on these thresholds.

Figure 3A:
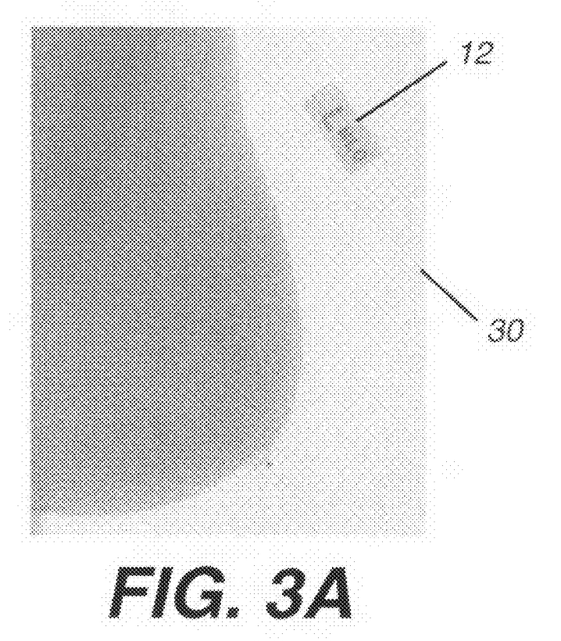
FIGS. 3A and 3B are plan views showing a mammography image with an LMLO view and segmented image.
Figure 3B:
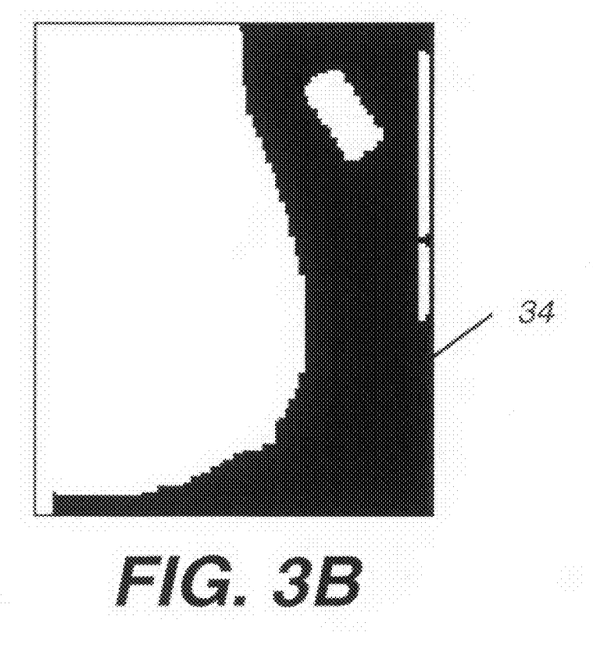
Figure 4A:
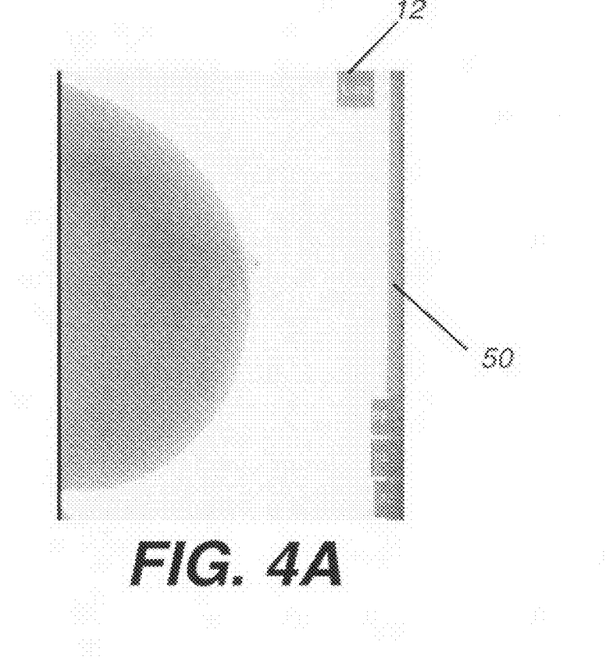
FIGS. 4A and 4B are plan views showing a mammography image with an LCC view and segmented image.
Figure 4B:
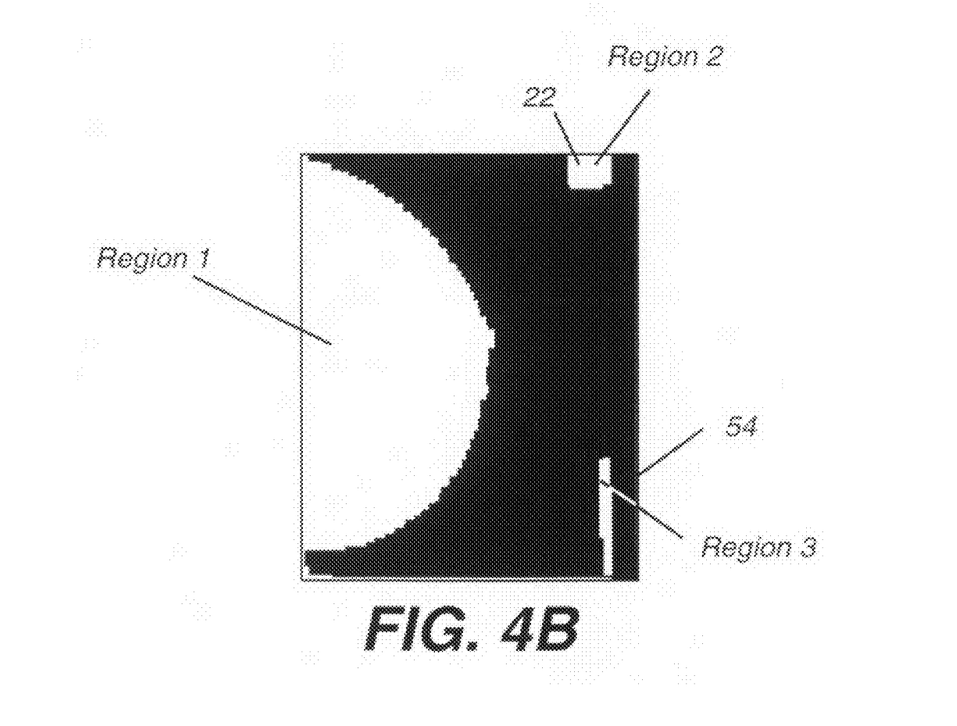

FIGS. 3A, 3B, 4A, and 4B show typical results from applying segmentation techniques, such as described in U.S. Publication No. 2005/0018893 (Wang et al.). In FIGS. 3A and 3B, LMLO image 30 is segmented to provide segmented image 34. In FIGS. 4A and 4B, processing of LCC image 50 yields segmented image 54.

Once an image is segmented, the foreground and background can be removed from the original mammogram image by setting their pixel value to a pre-defined value. As the result, the segmented image only contains the set of diagnostically relevant regions that are useful for further processing, both to determine type and laterality, and to perform the diagnostic assessment. Among these regions, the breast region is the major region in the image, labeled Region 1 in FIG. 4B.

In addition, each of these images has a marker region (shown, for example, at element 12 in FIGS. 3A and 4A, and at element 22 in FIG. 4B) that is one of the diagnostically relevant regions according to the method of the present invention. It is noted that text characters from the marker region are not needed for image identification. In FIG. 4B, marker region 22 is labeled as Region 2. Under some circumstances, a variable collimation region, incorrectly placed markers, or embedded cassette information can appear as other diagnostically relevant regions due to imperfect segmentation, such as is shown as Region 3 in the example of FIG. 4B. Regions 1 (breast region) and 2 (marker region 22) are the minimum set of diagnostically relevant regions needed for the method of the present invention. Additional regions, as exemplified by Region 3 in FIG. 4, may also be diagnostically relevant according to the present invention.

Referring again to FIG. 2, an analysis step 120 is executed on the diagnostically relevant regions, based on segmented images obtained from segmentation step 110. For this step, each region in the segmented image can first be uniquely labeled and assigned an integer, then analyzed. According to one embodiment of the present invention, the label number of each region is associated with the region's area. For example, as shown in FIG. 4B, the region with the largest area is assigned as Region 1, and the second largest region is assigned as Region 2, and so forth.

Figure 5A:
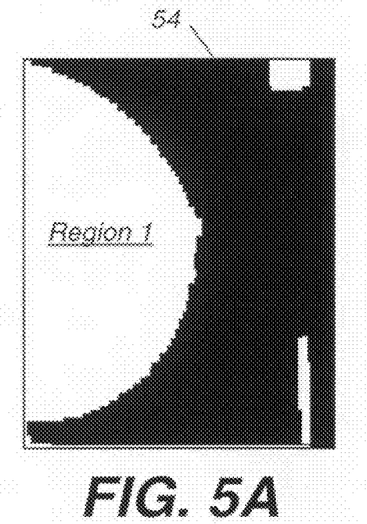
FIGS. 5A-5D are plan views showing segmented images and their corresponding vertical profiles.
Figure 5B:
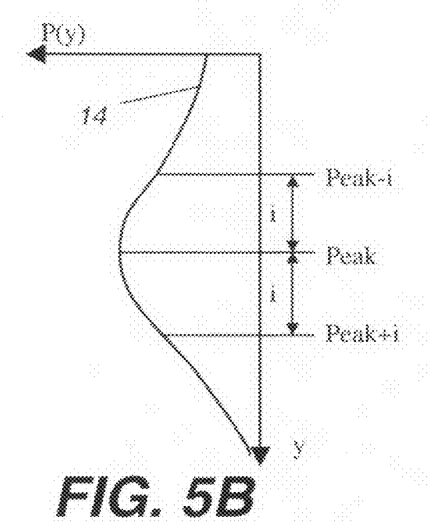
Figure 5C:
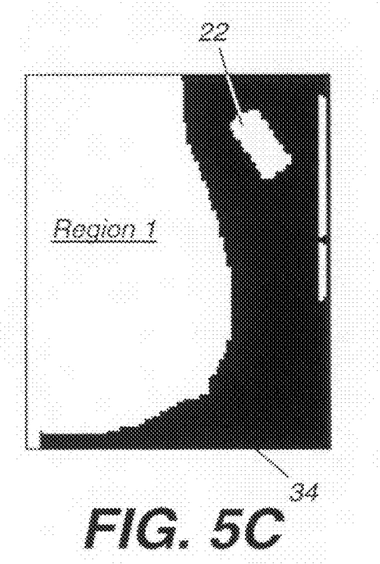
Figure 5D:
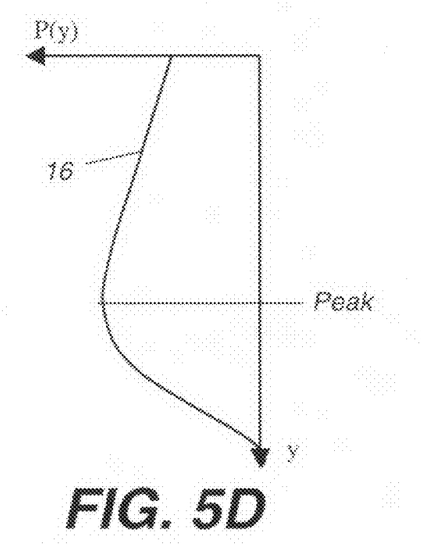

Region 1 will include the image of breast tissue and is used to determine the type of image, whether CC or MLO. FIGS. 5A and 5C show example segmented images 54 and 34 and illustrate key features used for this procedure. Referring to FIGS. 5B and 5D, for Region 1, a vertical profile 14, 16 is first extracted from the image by using the following equation:

$$P(y) = \sum_x f(I(x, y)) \quad (1)$$

$$f(I(x, y)) = \begin{cases} 1 & I(x, y) \in Region1 \\ 0 & I(x, y) \notin Region1 \end{cases}$$

where I(x,y) is the labeled image. In the present invention, an assumption is used for differentiating the MLO and CC views. That is, it can be assumed that the extracted profile of a CC view image generally includes a self-symmetrical portion, or is at least substantially more symmetrical than is the MLO view. A symmetry index can be computed as a measure of relative symmetry. In accordance with one embodiment of the present invention, analysis of the profile symmetry obtained in Equation (1) is accomplished by computing the symmetry index S of the profile, which is obtained by the following equation:

$$S = \frac{1}{\sum\limits_m^m \sum\limits_i |P(peak - i) - P(peak + i)|} \quad (2)$$

$$m = \begin{cases} peak & peak < rows - peak \\ rows - peak & peak \geq row - peak \end{cases}$$

where:

peak is location of the profile peak, that is, the row with the maximal profile value, as indicated in FIGS. 5B and 5D;

i is the distance from the peak (row number); and rows represents the total number of rows in the image.

By way of illustration, FIG. 5B shows an example vertical profile 14 for the LCC segmented image 54 of FIGS. 4B and 5A. FIG. 5D shows an example vertical profile 16 corresponding to the LMLO segmented image 34 of FIGS. 3B and 5C. According to Equation (2), the larger the symmetry index S, the more symmetrical will be the profile. In other words, the larger this index, the more likely that an image is of CC type, rather than MLO type.

It can be observed that the present invention is not limited to using this embodiment with Equation (2) or using profile symmetry in order to perform analysis for projection recognition. Other suitable algorithms may be known to those skilled in the art and can be employed, provided that they identify the difference between the two projection view types with some degree of accuracy.

Figure 6A:
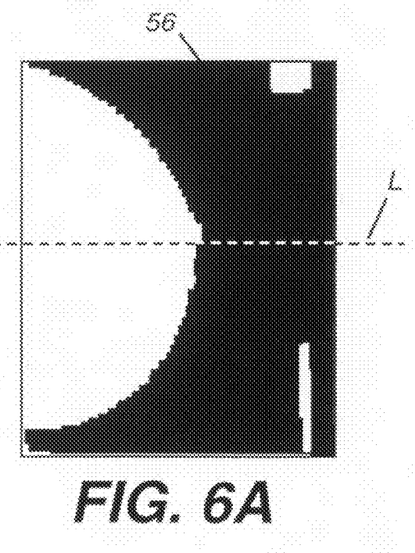
FIGS. 6A-6C are plan views showing one process for detecting laterality of images, according to one embodiment.

Analysis for identifying the laterality of mammography images takes advantage of the other diagnostically relevant regions, that is, the region or regions other than that containing the breast image. For example, in one embodiment, Region 1 is first effectively removed from the segmented image by setting each of its pixels to a predefined value. FIG. 6A shows a segmented cranio-caudal image 56 of a left breast, but having Region 1 removed. Then, the remaining image is split vertically (that is, in the cranio-caudal direction) into two equal-sized portions, as shown by top and bottom portions 58a and 58b in FIGS. 6B and 6C.

Figure 6B:
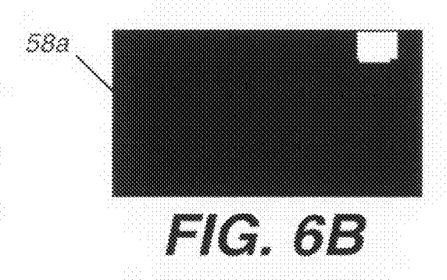
Figure 6C:
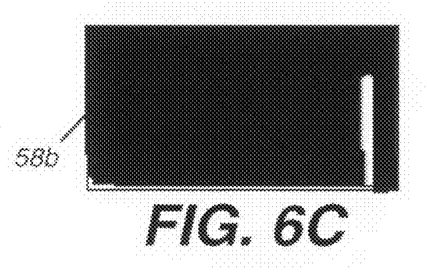

For each of these top and bottom portions, a laterality feature L is computed using the equation:

$$L = \sum_{x,y} f(I(x, y)) \quad (3)$$

$$f(I(x, y)) = \begin{cases} 1 & I(x, y) \in any\ Region \\ 0 & I(x, y) \notin any\ Region \end{cases}$$

where I(x,y) is the labeled image after removing the largest region (that is, Region 1).

Since the portion 58a has the larger laterality feature L value, the image 56 represents the left side of the patient; otherwise, it would represent the right side. According to one conventional hanging protocol for screening, the images from the right side of the patient appear on the left, and the images from the left side of the patient appear on the right portion of the display. As with the symmetry index S described earlier, the laterality feature L could alternately be calculated using any of a number of other algorithms, as alternatives to that given by way of example in Equation (3).

A similar approach can be used to identify the correct/incorrect orientation of mammogram images. Generally, if lower portion 58b has a larger L value, the image has incorrect orientation and needs to be rotated.

Referring again to FIG. 2, an identification step 130 is executed. Although the methods described for analysis in step 120 provide an indication of image type and laterality, there can be some ambiguity, due to patient differences, technician practices, and equipment differences. For this reason, identification step 130 of the present invention uses a probability vector for each input mammogram image. This method can use the approach described in U.S. Publication No. 2004/0234125, entitled "System And Method Of Assigning Mammographic View And Laterality To Individual Images In Groups Of Digitized Mammograms" by Menhardt et al., incorporated herein by reference.

Figure 7:
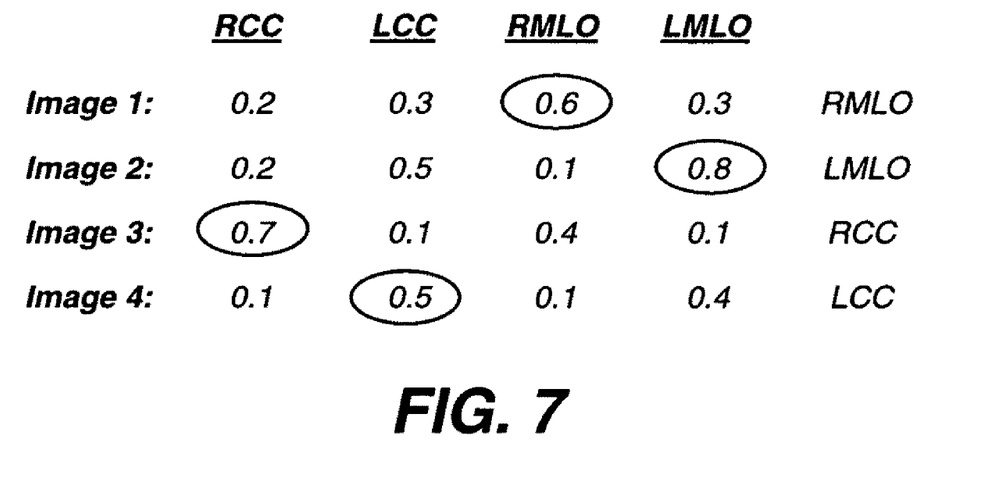
FIG. 7 is a table showing probability vectors used for type and laterality assignment, as practiced in one embodiment.

As shown in FIG. 7, the probability vector approach has four elements corresponding to the four possibilities for type and laterality (that is, LMLO, RLMO, RCC, and LCC). Each element entered in the table shown in FIG. 7 represents the probability of the input image having the specified view, based on analysis step 120 results. Using this approach, the symmetry index S (Equation 2) and laterality feature L (Equation 3) can be used to generate a probability vector for each image. The final decision on type and laterality is then made by evaluating the four probability vectors of images in the same study.

This method seeks global optimization by maximizing the sum of the probabilities of all mammograms of a patient. In the example of FIG. 7, Image 2 is clearly an LMLO image using this probability data. Images 1 and 3 can be determined with somewhat less confidence. Image 4 is assigned with a lower probability factor than other images. As a result, the sum of probabilities of all images is maximal among all possible sums.

At the conclusion of identification step 130, the image type and laterality of a set of standard mammography images can be automatically determined, along with its orientation. The detected type and laterality can then be assigned to each image and may be displayed along with the image or stored in a file header or in a separate file or other data structure that is associated with the image. Type and laterality assignment could also be displayed in an otherwise unused part of the image background. This assignment would allow the images to be displayed to a practitioner in suitable format, on one or more high-resolution display monitors, without the need for operator intervention or rearrangement. Image data stored with the assigned designation, such as in the image header or in some other manner, would then be available when an image is recovered from storage, such as from a PACS image storage system.

Unlike other approaches, the method of the present invention does not require that an operator use the correct lead marker when performing the image operation. The present invention uses a probabilistic model for decision-making and is thus adaptable to situations where there is somewhat less clarity about image type or there is ambiguity in the recognition results of one or two images in a study. While described primarily with regard to applications in mammography, the method of the present invention could be adapted to other types of diagnostic imaging, where it is a need to classify views taken from different perspectives or on different sides of the body.

The invention has been described in detail with particular reference to certain embodiments thereof, but it will be understood that variations and modifications can be effected within the scope of the invention as described above, and as noted in the appended claims, by a person of ordinary skill in the art without departing from the scope of the invention. For example, various types of image processing algorithms could be applied for segmentation and for determining image type and laterality. Any of a number of alternative approaches can be used for providing a symmetry index or computing a laterality feature.

Thus, what is provided is an apparatus and method for automatic detection of view type and laterality for digital mammographic images.

PARTS LIST

10 Display
12 Marker
14, 16 Vertical profile
20 RMLO image
22 Segmented marker image
30 LMLO image
34 Segmented image
40 RCC image
50 LCC image
54 Segmented image
56 Segmented image
58a, 58b Image portion
100 Image acquisition step
110 Segmentation step
120 Analysis step
130 Identification step

The invention claimed is:

1. A method for displaying a captured digital mammography image, the method comprising using a computer to perform steps of:
obtaining digital data of the mammography image;
segmenting the mammography image to identify at least a first diagnostically relevant region comprising an image of the breast tissue and a second diagnostically relevant region;
computing a symmetry index for the first diagnostically relevant region;
assigning a view type for the mammography image, either cranio-caudal or medio-lateral oblique view, according to the symmetry index;
computing a right breast or left breast laterality feature according to a relative position of the second diagnostically relevant region; and
assigning right breast or left breast laterality to the mammography image according to the laterality feature.

2. The method of claim 1 wherein computing the symmetry index is accomplished by:
forming a vertical profile of the segmented first diagnostically relevant region by identifying a peak row of pixels, wherein the peak row has a peak value corresponding to a maximum image contour along the horizontal; and
summing pixel values for each row above and below the peak row to obtain the symmetry index indicative of symmetry of the segmented first diagnostically relevant region.

3. The method of claim 1 wherein computing the laterality feature is accomplished by:
dividing the mammography image into upper and lower portions of equal size;
removing the first diagnostically relevant region from the mammography image;
summing pixel values for each row of the upper and lower portions to determine which portion includes a marker region as the its second diagnostically relevant region; and
assigning right breast or left breast laterality is accomplished by inferring the right breast or left breast laterality according to the determined marker region.

4. The method of claim 1 wherein segmenting the mammography image includes sub-sampling the mammography image at a lower resolution.

5. The method of claim 1 wherein the symmetry index yields information for generating a probability vector.

6. The method of claim 1 wherein the laterality feature provides an indicator of incorrect image orientation.

7. A method for displaying a plurality of captured mammogram images from a patient, the method comprising using a computer to perform steps of:
obtaining digital data of the mammography images;
segmenting the image to identify at least a first diagnostically relevant region comprising an image of the breast tissue and a second diagnostically relevant region;
computing a symmetry index for the first diagnostically relevant region;
computing a right breast or left breast laterality feature according to a relative position of at least the second diagnostically relevant region within the image;
generating a probability vector according to the symmetry index and the laterality feature for the image; and
using data of the probability vector to assign a view type, either cranio-caudal or medio-lateral oblique view, and a right breast or left breast laterality combination to the image.

8. The method of claim 7 wherein computing a symmetry index is accomplished by:
forming a vertical profile from the first diagnostically relevant region by identifying a peak row of pixels, wherein the peak row has a peak value corresponding to a maximum image contour along the horizontal; and
summing pixel values for each row above and below the peak row to obtain the symmetry index indicative of symmetry of the diagnostically relevant region.

* * * * *

UNITED STATES PATENT AND TRADEMARK OFFICE
CERTIFICATE OF CORRECTION

PATENT NO. : 7,796,793 B2  Page 1 of 1
APPLICATION NO. : 11/533404
DATED : September 14, 2010
INVENTOR(S) : Hui Luo It is certified that error appears in the above-identified patent and that said Letters Patent is hereby corrected as shown below:

claim 3 - column 8, line 24    Please delete the word "its"

Signed and Sealed this

Ninth Day of November, 2010

David J. Kappos
*Director of the United States Patent and Trademark Office*